April 10, 1951 — E. G. LINDER — 2,548,225
METHOD OF AND MEANS FOR GENERATING AND/OR CONTROLLING ELECTRICAL ENERGY
Filed Sept. 17, 1948
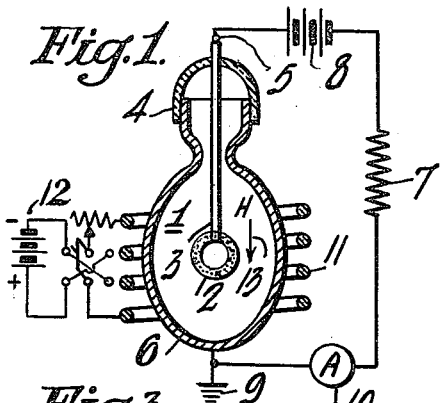
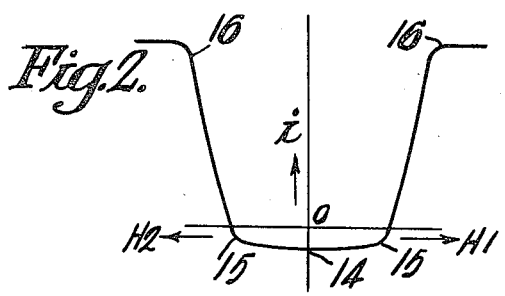
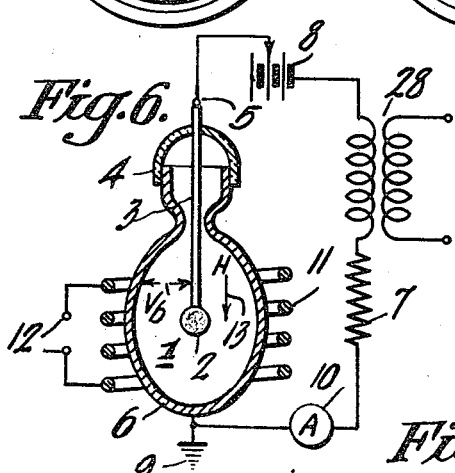
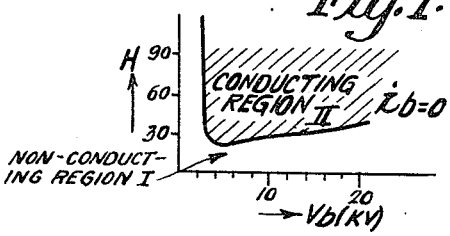
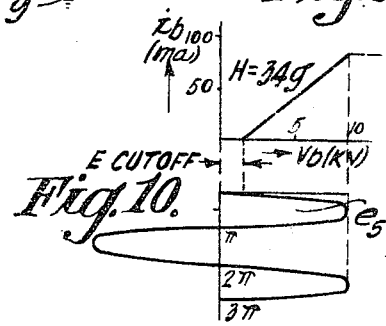
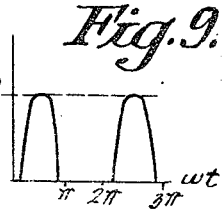
INVENTOR
*Ernest G. Linder*
ATTORNEY April 10, 1951 E. G. LINDER 2,548,225
METHOD OF AND MEANS FOR GENERATING AND/OR
CONTROLLING ELECTRICAL ENERGY
Filed Sept. 17, 1948 2 Sheets-Sheet 2
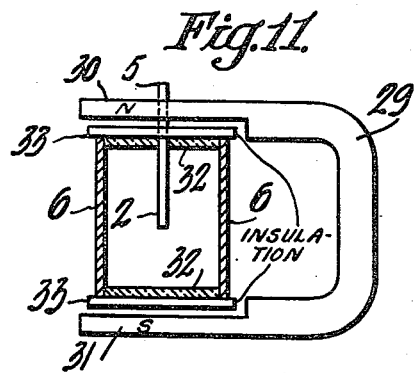
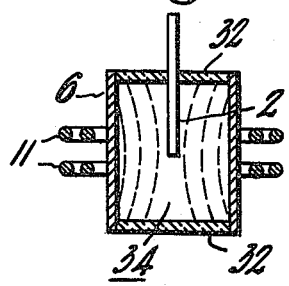
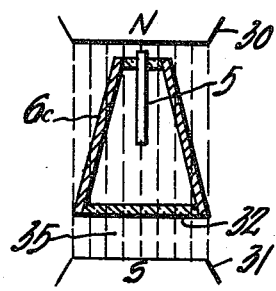
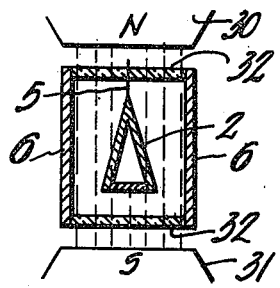
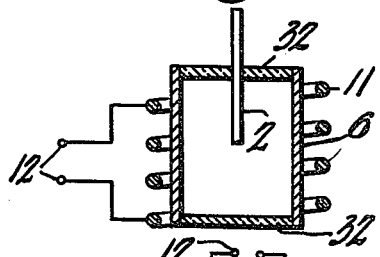
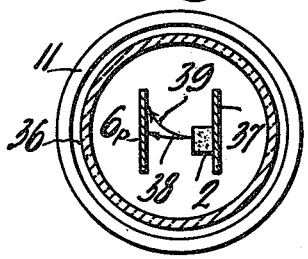
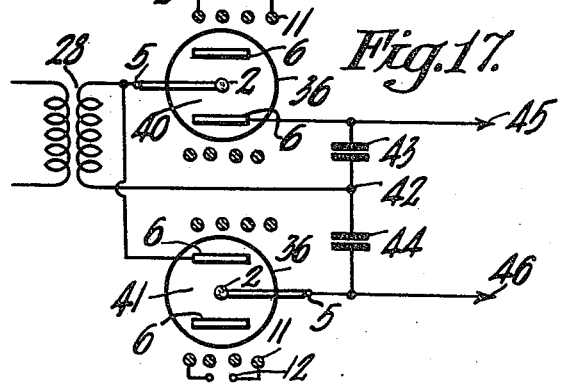
INVENTOR
*Ernest G. Linder*
BY
ATTORNEY Patented Apr. 10, 1951

2,548,225

UNITED STATES PATENT OFFICE 2,548,225

METHOD OF AND MEANS FOR GENERATING AND/OR CONTROLLING ELECTRICAL ENERGY

Ernest G. Linder, Princeton, N. J., assignor to Radio Corporation of America, a corporation of Delaware Application September 17, 1948, Serial No. 49,736

19 Claims. (Cl. 171—330)

This invention relates generally to nuclear electric generators and more particularly to unique methods of and means for utilizing the energy of nuclear reactions in the control of electrical energy.

It is known that certain isotopes are radioactive and emit nuclear charged particles at known rates over known periods of time and over a range of energy values or levels expressed in electron volts. Some emissions consist of positively charged or alpha particles, others of negatively charged or beta particles and others of both alpha and beta particles. With the emission of a charged particle from the nucleus of an atom, there occurs a transmutation of the atom into an atom of another element and this atom may or may not be radioactive and it may or may not be gaseous in form.

It is also known that when certain materials are subjected to nuclear radiation bombardment, a number of electrons around the nuclei of the bombarded atoms are knocked out of their orbits and projected into space. This phenomenon is known as secondary emission. The number of secondary electrons emitted per bombarding particle depends upon the bombarded material itself and upon angle of incidence and the velocity of the bombarding particle. In general, the less the angle of incidence of a high energy particle the less is the number of secondary emitted electrons; and the less the velocity of a bombarding particle beyond a predetermined value, the greater is the number of secondary emitted electrons.

A small fraction of these secondary emitted electrons have energies comparable with the primaries, the rest have relatively low energy values compared with the primary emission values. Their further movements after leaving the bombarded surface depends upon their initial velocities and their initial random direction and upon the electrostatic and electromagnetic fields in the region in which they travel.

When these secondary electrons strike other secondary-emission responsive materials, further secondary emissions may occur, the amount of such secondary emission depending upon the velocity of the electrons and the angles of incidence and the character of the material bombarded. Gas ionization may also produce additional electrons.

The invention disclosed herein comprises new methods of application of and apparatus responsive to the principles set forth hereinbefore. A primary nuclear radiation is directed to a charged particle secondary-emission responsive material or electrode to initiate conduction electrons by secondary emission. The source of the primary radiation and the electrode are positioned in a rarefied medium or in gas in a tube, with suitable connections from the source and the electrode to an external load circuit, which includes the load resistance and source of electric voltage. The envelope of the tube is of such material that when the tube is subjected to a magnetic field, the electromagnetic lines of force will permeate through the space between the source and the electrode and affect the paths of the charged particles moving within the tube to cause ionization of the gas. Conduction currents will then flow through the tube and the load circuit which includes a source of electric potential to keep the radioactive source at a predetermined potential. It will, therefore, be seen that the invention is useful to control electron multiplication and electron flow, to rectify high voltages, to modulate currents or is useful in conventional high vacuum diode circuits, such as full wave rectifiers or in circuits using a "cold" cathode, such as a voltage doubler.

In considering the available radioactive materials, phosphorus[32] has been selected to illustrate the invention as it is a pure beta emitter of sufficient average energy levels for the particles to reach the secondary emission responsive electrode of the tube and with sufficient energy as to cause secondary electron emission. Also, phosphorus[32] becomes stable after emission and is particularly adapted to high vacuum tube use as its decay products are not gaseous. There are, however, a large number of other suitable radioactive substances that may be used within the scope of the invention.

The principal object of the invention is to provide a new method of and means for utilizing the energy of nuclear reactions in the generation and control of electrical energy. Another object of the invention is to utilize the energy of nuclear reactions and electromagnetic fields in the generation and control of electrical energy.

An additional object of the invention is to provide new methods of and means for utilizing nuclear reactions in the generation of relatively large electrical currents. Another object of the invention is to obtain large values of electron multiplication.

Another object of the invention is to provide new methods and means for the rectification for high voltages, the multiplication of currents and the doubling of voltages.

A further object is to provide improved methods of and means for controlling the paths of charged particle radiation resulting from nuclear reactions. A still further object is to provide improved methods of and means for lengthening the path of a charged particle moving within an enclosed space containing a rarefied gas, that the path may exceed the mean free path for ionization by collision of the molecules of the gas. A further object is to impose various forms of magnetic fields upon the charged particle emissions resulting from nuclear reactions in a confined space. A further object is to provide improved shapes of a radioactive source and collector therefor. A further object is to provide improved relative positions of radioactive sources and collectors therefor.

The various embodiments and features of the invention will be described in detail hereinafter by reference to the accompanying drawings of which Figure 1 is a schematic diagram of a first embodiment of the invention comprising a nuclear electrical generator tube provided with a magnetic field supplied by a solenoid and a source of constant electrical potential in the load circuit of the tube; Figure 2 is a graph showing the relation of load current to various values of the magnetic field; Figure 3 is a schematic diagram of the paths of beta-particles of different energy levels originating in the radioactive source, as deflected by a magnetic field; Figures 4 and 5 are schematic diagrams of the paths of secondary electrons emitted upon the bombardment of the collector by electrons; Figure 6 is a schematic diagram of a nuclear electric generator provided with a magnetic field supplied by a solenoid, and a source of alternating electric potential impressed on the load circuit and the radioactive source, and a biasing potential source; Figure 7 is a graph showing relation between the magnetic field and the voltage across the tube in Figure 6 when the tube is just non-conductive; Figure 8 is a graph showing the relation between the current in the load circuit to the voltage across the tube in Figure 6 for a constant value of the magnetic field; Figure 9 is a graph of the voltage impressed upon the radioactive source within the tube in Figure 6 plotted against time; Figure 10 is a graph of the drop of potential across the load resistance in Figure 6 plotted against time; Figure 11 is a schematic diagram of a nuclear electric generator provided with a radioactive source in the form of a rod, a collector in the form of a sheet cylinder and a magnetic field supplied by a permanent magnet; Figure 12 is a schematic diagram of a nuclear electric generator provided with a radioactive source in the form of a rod, a collector in the form of a cylindrical sheet and a magnetic field supplied by a solenoid relatively short along its axis; Figure 13 is a schematic diagram of a nuclear electric generator provided with a radioactive source in the form of a rod, a collector in the form of a truncated-cone-like sheet and a magnetic field supplied by a permanent magnet; Figure 14 is a schematic diagram of a nuclear electric generator provided with a radioactive source in the form of a cone, a collector in the form of a cylindrical sheet and a magnetic field supplied by a permanent magnet; Figure 15 is a schematic diagram of a nuclear electric generator provided with a radioactive source in the form of a rod, an axially displaced collector in the form of cylindrical sheet and a magnetic field supplied by a solenoid; Figure 16 is a schematic diagram of a nuclear electric generator provided with a radioactive source lumped on flat plate, a collector in the form of a flat plate and a magnetic field supplied by a solenoid; and Figure 17 is a schematic diagram of the invention applied to voltage doubling.

Similar reference characters are applied to similar elements throughout the drawing.

Referring to the drawings, Figure 1 illustrates one embodiment of the invention which includes a tube 1 in which is positioned a source of radioactive material 2 mounted on a conducting support 3 which passes through insulator 4. A terminal connection 5 is provided outside the tube 1 for source 2 and support 3. The envelope of the tube 1, except for insulator 4, is made of some conductive and non-magnetic material which is capable of maintaining a high vacuum within the tube 1 and also is charged-particle secondary-emission responsive to the primary nuclear radiation from source 2. This portion of the envelope of tube 1 will be designated hereinafter as collector 6. Aluminum has been found to be a suitable material for collector 6.

Tube 1 is maintained at a high vacuum by any conventional means, not shown. There will, however, be some residual air or gas medium at a pressure, for example, of $10^{-3}$ mm. Hg. within the tube, which is necessary for the operation of the device, as will be fully disclosed hereinafter.

The collector 6 of a tube used in practice, as shown in Figure 1, was ellipsoidal in shape and about seven inches in equatorial diameter. The source 2 was toroidal in shape and of about two inches in its maximum diameter. It will be understood that the collector 6 and source 2 may be of various shapes and dimensions according to the particular results desired, as will be more fully disclosed hereinafter.

The external circuit of the tube in this first embodiment of the invention consists of a load resistance 7 and a source of constant electric voltage 8, in series with each other and connected to terminal 5 and to collector 6. Collector 6 may be grounded as at 9. The positive pole of source 8 is connected to terminal 5, that the source 2 may be kept positive with respect to collector 6. An ammeter 10 is connected in series with the load circuit, to indicate the current flowing in the load circuit.

Surrounding the tube 1 is positioned a solenoid 11 which is connected to a source 12 of direct current, which may be varied in strength and direction to impress upon the tube the desired strength and direction of the magnetic field H.

When the device is arranged as shown in Figure 1 and the solenoid is not connected to the direct source at terminals 12, the source 2 becomes positive due to the loss of electrons by nuclear radiation. The secondary radiation from collector 6 will be very small and may be generally disregarded as the bombarding particles strike the collector at practically zero angle of incidence. As the potential of source 2 is built up positively, some of the low energy primary particles will be reversed and travel back to the source 2. A state of equilibrium will thus be reached and a steady current due to the primary emission of source 2 will flow through the load circuit.

When a magnetic field H is impressed upon the tube, as indicated by arrow 13, and the strength of the field is increased gradually, little if any change occurs in the value of the load current until a critical value of the field strength is reached, when the direction of the load current is reversed and the load current increases from $10^8$ to $10^9$ times that to the primary emission current. Direct current source 8 furnishes the necessary power to keep source 2 at a positive potential.

It has been found that the same critical conditions of magnetic field values exist when the connections at terminal 12 are reversed and the magnetic field is reversed to a direction opposite to that indicated by arrow 13.

A plot of the relation between the load current and the magnetic field is shown in Figure 2.

When no magnetic field is impressed upon the tube, the value of the primary emission current is indicated at point 14. The critical values of the magnetic field are indicated at points 15. If the field is increased beyond the values corresponding to points 16, only very small increases in current will be obtained. It will be noted that the plot is symmetrical about the zero ordinate.

It is believed that the basis for these discovered phenomena is that when there is no magnetic field present between the source 2 and the collector 6, the paths of the radiation particles from source 2 are straight lines, as indicated by arrow 17 in Figure 3. As the angle of incidence of the paths of the particles to the collector 6 is practically zero, the particles are captured or collected by collector 6 with little secondary charged-particle emission. This is particularly true of high energy particles from source 2.

As the magnetic field is increased, it deflects the paths of the charged particles more and more, inversely as the velocity of the individual particles. Some of the particles of higher velocities will still follow a path such as arrow 17, but the paths of a large proportion of the medium velocity particles will be deflected, as indicated by arrow 18. Such particles cause substantial secondary emission charged particles to be emitted from the surface of collector 6. Some of the lower velocity primary emission particles will be deflected and returned to source 2, as indicated by arrow 19.

The secondary electrons are emitted from collector 6 at relatively low velocities compared with the velocities of the primary particles, but they are likewise affected by the magnetic field and the electrostatic field between source 2 and collector 6. They are accelerated towards source 2, as it is of a positive potential.

Whether these secondary electrons reach source 2 will depend upon their velocities and the strength of the magnetic field, as the magnetic field may be adjusted to such a value that they are cut off from reaching source 2 and are deflected to pass by source 2.

The equation defining the conditions under which the secondary electrons will cut off from or miss source 2 is $$H > 2\sqrt{2} \cdot \sqrt{\frac{m}{e}} \cdot \frac{r}{R^2} \sqrt{V} \qquad (1)$$

where $e$ is the charge of particle, H is the magnetic field, M is the mass of the particle, $r$ is the radius of the source 2, R is the radius of collector 6 and V is the potential of source 2, all in c. g. s. units. (See Hull, Physics Review 1921, volume 18, page 35.)

A probable path of an individual secondary electron emitted from collector 6 is shown by arrow 20 in Figure 4. The electron is shown as originating at point 21 and following the path 20a to point 22. This electron may leave collector 6 as a secondary emission electron or as a result of thermionic or photoelectric effects, or otherwise. The electron is accelerated towards source 2 as source 2 is maintained positive, but due to the magnetic field H the electron is deflected and is cut off from reaching source 2. After passing source 2, the electron is decelerated and strikes collector 6 at point 22 where it is again reflected and follows path 20b to point 23 where it again may be reflected and follows path 20c to point 24 and follows path 20d, until the electron loses its velocity when it is no longer affected by the magnetic field. The electron still is, however, affected by the electrostatic field between source 2 and collector 6.

At each point of reflection by collector 6, points 22, 23 and 24, further secondary emissions may occur. Figure 5 shows the probable paths of three secondary electrons emitted from point 24, which corresponds to one of the points of reflection, 24 in Figure 4. In Figure 5 the paths of the three secondary electrons are shown to be as diverging from point 24, as their original directions are at random directions. Their paths throughout the tube are shown by the arrows 25, 26, 27. At each point of contact of these secondary electrons with the collector 6, further secondary electrons may be emitted. It will thus be apparent that a copious supply of the electrons is released, the electrons are "trapped" within the confines of collector 6 and the paths of the electrons before capture are increased: It has been found that by the adjustment of the value of the magnetic field H, the mean path of the electrons may be increased beyond the mean free path for ionization by collision with a molecule of the gas, which causes ionization of the gas and the gas becoming conductive.

This theory has been verified by conducting a test of the arrangement shown in Figure 1, during which test the magnetic field H and the voltage source 8 were held constant and the gas pressure varied. In such a test, a current of 200 milliamperes was observed on the ammeter 10 when the gas pressure was 0.03 mm. of mercury and when the gas was at a pressure of $10^{-5}$ mm. of mercury, the current observed at 10 was only 0.6 milliampere.

When ionization occurs and the gas becomes conductive, there is a copious supply of electrons that flow to source 2 as long as it is maintained positive by the electrical source 8. With such flow, there will be further ionization by the electrons striking further atoms of the gas. This increases the number of conduction electrons. At the same time there will be a flow of positive ions to collector 6, as collector 6 is of a negative potential. This positive ion bombardment of collector 6 will cause further secondary emission from collector 6.

As previously pointed out herein, the device was found to be conductive only when source 2 was at a positive potential. It is, therefore, practicable to modulate the load current in accordance with the modulations of an independent current by impressing that modulating current upon the load circuit, such as by a transformer 28, see Figure 6. The primary of transformer 28 is connected to the signal and the secondary is connected in series in the load circuit.

As a guide in the practical application of the invention to individual conditions of operation, the electrical characteristics of the device may be determined and plotted in the form of curves, the same as for other vacuum tubes. One such characteristic curve is set forth in Figure 7, which is a graph showing the relation of the strength of the magnetic field H, in gauss, to the voltage across the tube Vb in kilovolts, when the tube is just non-conducting, that is, the current across the tube $ib$ is zero. This graph is designated as the current-cut off curve.

In Region I of Figure 7, the secondary electrons are being captured or collected by source 2 until at values of the magnetic field and the potential of source 2 for a particular tube (see Equation 1) the secondary electrons are cut off or diverted from source 2. Their paths then become lengthened, ionization occurs and the tube becomes conductive (see Region II, Figure 7), as previously explained.

Likewise, a current-voltage characteristic curve for a particular value of magnetic field may be plotted. A typical curve is shown in Figure 8 for a constant value of H of 34 gauss. From the slope of this curve, the conductance of the tube may be determined.

These characteristic curves may be used in the conventional manner to determine the potential drop along the resistance 7 in the load circuit when an alternating or a modulated voltage is impressed upon source 2. For example, a sine wave potential may be impressed on source 2 by connecting the primary of transformer 28, Figure 6, to a source of current the wave form of which is sinusoidal. If the maximum drop of potential along the secondary of transformer 28 is E, the instantaneous values of potential as impressed upon source 2 would be $$e_s = E_s \sin \omega t \quad (2)$$

This may be plotted as in Figure 9, directly below the conductance curve (Figure 8) and the values of the drop in potential along the load resistance may be plotted on a corresponding voltage-time curve (see Figure 10) as is conventional and well known in the vacuum tube art. The results shown in Figure 10 have been verified by oscillograph records.

The voltage impressed upon source 2 may be biased by adjusting the values of the electrical voltage source 8 or by auxiliary sources.

While the magnetic field H is shown in Figure 2 as being produced by a solenoid 12, energized by a direct current source, it is practical to produce the magnetic field by other means, such as a permanent magnet. Such a magnet is shown generally at 29 in Figure 11. The two pole pieces 30 and 31 embrace spacially the collector 6, which is shown as a cylindrical metal sheet envelope closed at each end by discs 32 which are made of suitable dielectric or non-magnetic material, such as glass. These discs are preferably flat so that the collector may fit snugly between the pole pieces. Insulators 33 separate pole pieces 30 and 31, respectively, from the two ends of collector 6 and discs 32. Source 2, shown in the form of a rod, is supported in position by conventional insulators (not shown) as it passes through pole disc 32, insulator 33 and pole piece 30. The operation of the device is as previously described.

Inasmuch as the device functioned in a stabilized or equilibrium condition, it is apparent that although the gas within the envelope becomes ionized with resulting flow of electrons to the source 2, the energy levels of a fraction of the primary emission particles are high enough under the existing conditions for the primary emitted particles to reach collector 6 which they are collected or deflected successively and with secondary emission as hereinbefore disclosed.

As the current in the load circuit depends upon the form and length of the paths of the secondary emission particles, the operating characteristics of the device may be determined and adjusted by changing the geometrical relations of the source 2, the collector 6 and the magnetic field H. Several additional geometrical relations are shown in Figures 12, 13, 14, 15 and 16.

In Figure 12 the source 2 is shown as a thin rod, the collector 6 as a cylindrical sheet with glass disc ends 32, as in Figure 11, and the solenoid 11 as being relatively short along the axis of the collector 6. With such an arrangement, the magnetic field, shown generally at 34, Figure 12, is not uniform along the axis of collector. This non-parallel magnetic field will produce, during operation of the device, spiral paths of varying amplitudes and varying amounts of electron trapping, with resulting varying operating characteristics.

In Figure 13, a uniform field 35 is produced between the poles 30 and 31 of a permanent magnet, but the collector 6c is formed into a truncated-cone-like sheet with glass discs 32 closing the ends thereof. In this arrangement, a larger proportion of the lower energy particles from source 2 will reach the collector 6c at its end of lesser diameter, which will vary the amount of secondary emissions that will later be drawn into lengthened paths. Also, the angles of incidence of the primary emitted particles, as they bombard collector 6c, will not be practically zero as in the arrangements shown in Figures 1 and 6. The same general effect, described as to the device shown in Figure 13, may be obtained, as shown in Figure 14, by making the source 2 in the form of a cone or mounting the source material on a cone-shaped metal base. The collector 6 in this arrangement is in the form of a cylindrical sheet. The magnetic field 35 will be uniform if the source 2 or base thereof is non-magnetic, but the field within the collector may be made to be distorted, and especially so at the base end of source 2, by using a magnetic material as the base upon which the source material is mounted.

Variable trapping effects and variable paths of particles may also be produced by longitudinally offsetting in spaced relation the source 2 and collector 6, as shown in Figure 15. In such an arrangement, the magnetic field is uniform along the solenoid axis but there will be a concentration of primary emitted particles from source 2 axially disposed only in the upper (as shown in Figure 15) portion of the envelope space. This will cause variations in the trajectories of the particles throughout the whole of the envelope space.

It is not necessary in the practicing of this invention that the collector 6c be of the shapes shown in Figures 1, 11 or 13. The collector may be a flat plate 6p (see Figure 16) mounted in a glass envelope 36 and the source 2 may be concentrated as a lump and mounted on a plate, such as plate 37. The solenoid 11 produces the magnetic field H (in a direction coming out of the plane of Figure 16) which deflects high velocity particles slightly, as shown by arrows 38, and the lower velocity particles to a greater degree, as shown by arrow 39. The secondary emission particles are affected by the magnetic field and assume the lengthened paths with attending ionization of the gas within the envelope as hereinbefore disclosed.

It is of course apparent that the relative physical positions of the source 2 and the collector 6 may be reversed and the invention, as disclosed, may be used equally effective by using an alpha emitter as the source 2.

As previously stated, the invention also has practical uses in circuits using a "cold" cathode tube. An example of such use is shown as a voltage doubler circuit in Figure 17. Two tubes, as described in connection with Figure 1, are connected to a source of alternating current through transformer 28. One terminal of the secondary of transformer 28 is connected to terminal 5 of tube 40 and to the collector 6 of tube 41. The other terminal of the secondary of transformer 28 is connected to the midpoint of the two output condensers 43 and 44. Collector 6 of tube 40 is connected to the second terminal of condenser 43 and terminal 5 of tube 41 is connected to the second terminal of condenser 44. The output terminals of the device are shown as 45 and 46 respectively. From the curves of tubes 40 and 41, as set forth in Figures 7, 8, 9 and 10, it is apparent that the tubes have rectifying characteristics under the operating conditions disclosed and therefore are suitable for use in the conventional voltage doubling circuit as set forth in Figure 17.

What is claimed is:

1. The method of generating and controlling electrical energy comprising: providing a charged particle emission source in a gaseous medium, generating secondary charged particles in response to said emission, lengthening the normal paths of said secondary particles within the medium until the paths of said particles are longer than the mean free path for ionization by collision with a molecule of said medium and ionization of said medium occurs, applying an electric potential to said source, and utilizing the said secondary particles to provide an electric current.

2. The method of generating and controlling electrical energy comprising: providing a charged particle emission source in a gaseous medium in an enclosure, generating secondary charged particles in response to said emission, lengthening the normal paths of said secondary particles within the medium until the paths of said particles are longer than the mean free path for ionization by collision with a molecule of said medium and ionization of said medium occurs, maintaining said source at a potential positive in respect to said enclosure, and utilizing the said secondary particles to provide an electric current.

3. The method of generating and controlling electrical energy comprising: providing a charged particle emission source in a gaseous medium, generating secondary charged particles in response to said emission, lengthening the normal paths of said secondary particles within the medium until the paths of said particles are longer than the mean free path for ionization by collision with a molecule of said medium and ionization of said medium occurs, applying a varying electric potential to said source, and utilizing the said secondary particles to provide an electric current.

4. The method of generating and controlling electrical energy comprising: providing a charged particle emission source in a gaseous medium, generating secondary charged particles in response to said emission, subjecting said secondary particles to the force of a magnetic field and thereby lengthening the normal paths of said secondary particles within the medium until the paths of said particles are longer than the mean free path for ionization by collision with a molecule of said medium and ionization of said medium occurs, applying an electric potential to said source and utilizing the said secondary particles to provide an electric current.

5. The method of generating and controlling electrical energy comprising: providing a charged particle emission source in an enclosure generating secondary charged particle emission in response to said emission, subjecting said secondary particles to the force of a magnetic field to direct said secondary particles successively against the surface of said enclosure and thereby lengthening the normal paths of said secondary particles within the medium until the paths of said particles are longer than the mean free path for ionization by collision with a molecule of said medium and ionization of said medium occurs, applying an electric potential to said source, and utilizing the said secondary particles to provide an electric current.

6. The method of generating and controlling electrical energy comprising: providing a primary charged particle emission source in an enclosure, generating secondary charged particles in response to said primary emission, subjecting said secondary particles to the force of a magnetic field to direct said secondary particles successively against the surface of said enclosure to generate further secondary emission charged particles and to lengthen the normal paths of said secondary and said further secondary particles within the medium until the paths of said particles are longer than the mean free path for ionization by collision with a molecule of said medium and ionization of said medium occurs, applying an electric potential to said source and utilizing the said secondary particles to provide an electric current.

7. Apparatus for generating and controlling electrical energy including: a source of radioactive material in a rarefied gaseous medium providing charged particle radiation, means disposed in a region adjacent said source and responsive to said radiation to provide secondary charged particle emission, means for applying an electric potential to said source, means for deflecting the paths of said secondary particles to lengthen said paths until the said lengths are greater than the mean free path for ionization by collision with a molecule of said medium to provide ionization of said medium, and means for utilizing said secondary particles to provide an electric current.

8. Apparatus for generating and controlling electrical energy including: a source of radioactive material in a rarefied gaseous medium providing charged particle radiation, means disposed in a region adjacent said source and responsive to said radiation to provide secondary charged particle emission, means for applying a varying electric potential to said source, means for deflecting the paths of said secondary particles to lengthen said paths until the said lengths are greater than the mean free path for ionization by collision with a molecule of said medium to provide ionization of said medium, and means for utilizing said secondary particles to provide an electric current.

9. Apparatus for generating and controlling electrical energy including: a source of radioactive material in a rarefied gaseous medium providing charged particle radiation, means disposed in a region adjacent said source and responsive to said radiation to provide secondary charged particle emission, means for maintaining said source positive with respect to said responsive means, means for deflecting the paths of said secondary particles to lengthen said paths until the said lengths are greater than the mean free path for ionization by collision with a molecule of said medium to provide ionization of said medium, and means for utilizing said secondary particles to provide an electric current.

10. Apparatus for generating and controlling electrical energy including: a source of radioactive material in a rarefied gaseous medium providing charged particle radiation, means disposed in a region adjacent said source and responsive to said radiation to provide secondary charged particle emission, means for applying an electric potential to said source, electromagnetic means for deflecting the paths of said secondary particles to lengthen said paths until the said lengths are greater than the mean free path for ionization by collision with a molecule of said medium to provide ionization of said medium, and means for utilizing said secondary particles to provide an electric current.

11. Apparatus for generating and controlling electrical energy including: a source of radioactive material in a rarefied gaseous medium providing charged particle radiation, means disposed in a region adjacent said source and responsive to said radiation to provide secondary charged particle emission, means for applying an electric potential to said source, means for deflecting the paths of said secondary particles successively against said responsive means to lengthen said paths until the said lengths are greater than the mean free path for ionization by collision with a molecule of said medium to provide ionization of said medium, and means for utilizing said secondary particles to provide an electric current.

12. Apparatus for generating and controlling electrical energy including: a source of radioactive material in a rarefied gaseous medium providing charged particle radiation, means disposed in a region adjacent said source and responsive to said radiation to provide secondary charged particle emission, means for applying an electric potential to said source, means for deflecting the paths of said secondary particles successively against said responsive means to provide additional secondary charged particle emission and to lengthen said paths until the said lengths are greater than the mean free path for ionization by collision with a molecule of said medium to provide ionization of said medium, and means for utilizing said secondary particles to provide an electric current.

13. Apparatus for generating and controlling electrical energy including: a source of radioactive material in a rarefied gaseous medium providing charged particle radiation, means disposed in a region adjacent said source and responsive to said radiation to provide secondary charged particle emission, means for applying an electric potential to said source, a solenoid energized by a direct current source positioned to apply the magnetic field thereof to the space between said source and said responsive means, and means for utilizing said secondary particles to provide an electric current.

14. Apparatus for generating and controlling electrical energy including: a source of radioactive material in a rarefied gaseous medium providing charged particle radiation, means disposed in a region adjacent said source and responsive to said radiation to provide secondary charged particle emission, means for applying an electric potential to said source, a permanent magnet the poles of which are positioned adjacent said source and said responsive means, and means for utilizing said secondary particles to provide an electric current.

15. Apparatus for generating and controlling electrical energy including: a source of radioactive material in an exhausted gaseous medium providing primary charged particle radiation, means disposed in said medium adjacent to said source and responsive to said radiation to provide secondary emission of charged particles, the said means being so disposed with relation to said source that one portion of said means is closer to said source than another portion of said means, means for deflecting the said secondary emission particles within the medium to lengthen the paths thereof until the said lengths are longer than the mean free path for ionization by collision with a molecule of said medium and ionization of said medium occurs, and means for utilizing said particles to provide an electric current.

16. Apparatus for generating and controlling electrical energy including: a source of radioactive material in an exhausted gaseous medium providing primary charged particle radiation, means disposed in said medium adjacent to said source and responsive to said radiation to provide secondary emission of charged particles, the said source and said means being in overlapping positional relation to each other, means for deflecting the said secondary emission particles within the medium to lengthen the paths thereof until the said lengths are longer than the mean free path for ionization by collison with a molecule of said medium and ionization of said medium occurs, and means for utilizing said particles to provide an electric current.

17. Apparatus for generating and controlling electrical energy including: a source of radioactive material in an exhausted gaseous medium providing primary charged particle radiation, electrode means disposed in said medium adjacent to said source and responsive to said radiation to provide secondary emission of charged particles, axially concentrated electromagnetic means for deflecting the said secondary emission particles within the medium to lengthen the paths thereof until the said lengths are longer than the mean free path for collision with a molecule of said medium and ionization of said medium occurs, and means for utilizing said particles to provide an electric current.

18. In combination, a pair of devices each according to claim 17, a pair of electric condensers connected in series, means for impressing a varying potential between the said source of the first tube and the inside midpoint between said condensers and between the electrode means of the second tube and the inside midpoint between said condensers, means for connecting the electrode means of the first tube to the outside terminal of the first said condenser, means for connecting the source of said second tube to the outside terminal of the second condenser, and outlet means connected to the outside terminals of said condensers.

19. Apparatus according to claim 7 characterized by the said source consisting of a concentrated mass of radioactive material mounted on a supporting plate and the source responsive means consisting of a plate adjacent to said supporting plate.

ERNEST G. LINDER.

REFERENCES CITED

The following references are of record in the file of this patent:

UNITED STATES PATENTS

| Number | Name | Date |
|---|---|---|
| 824,637 | De Forest | June 26, 1906 |
| 1,114,697 | Hull | Oct. 20, 1914 |